United States Patent [19]

Ishida

[11] Patent Number: 4,479,470
[45] Date of Patent: Oct. 30, 1984

[54] INTAKE PASSAGE STRUCTURE FOR INTERNAL COMBUSTION ENGINES

[75] Inventor: Tokuzi Ishida, Hamamatsu, Japan

[73] Assignee: Suzuki Jidosha Kogyo Kabushiki Kaisha, Kami, Japan

[21] Appl. No.: 402,693

[22] Filed: Jul. 28, 1982

[30] Foreign Application Priority Data

Aug. 11, 1981 [JP] Japan ................. 56-124653

[51] Int. Cl.³ ............... F02M 35/10; F02M 13/04
[52] U.S. Cl. ........................ 123/308; 123/339; 261/23 B
[58] Field of Search ............. 123/306, 308, 188 M, 123/432, 339, 579, 582, 429; 261/23 A, 23 B, 23 C, 144

[56] References Cited

U.S. PATENT DOCUMENTS

| | | | |
|---|---|---|---|
| 4,086,885 | 5/1978 | Noguchi et al. | 261/23 B |
| 4,108,124 | 8/1978 | Nakagawa et al. | 261/144 |
| 4,256,063 | 3/1981 | Sumiyoshi et al. | 261/23 B |
| 4,323,038 | 4/1982 | Motosugi et al. | 123/308 |

FOREIGN PATENT DOCUMENTS

| | | | |
|---|---|---|---|
| 22032 | 2/1979 | Japan | 261/23 A |
| 93922 | 7/1980 | Japan | 123/188 M |

*Primary Examiner*—Ira S. Lazarus
*Assistant Examiner*—R. S. Bailey
*Attorney, Agent, or Firm*—Flynn, Thiel, Boutell & Tanis

[57] ABSTRACT

An intake passage structure for an internal combustion engine includes a primary air-fuel mixture passage disposed remotely from a water jacket located below a secondary air-fuel mixture passage. A secondary slow fuel supply passage extends from a float chamber adjacent to the primary air-fuel mixture passage so that fuel in the secondary slow fuel supply passage will be cooled by an air-fuel mixture flowing through the primary air-fuel mixture passage, thereby preventing vapor lock from occuring in the secondary slow fuel supply passage. The primary air-fuel mixture passage is composed of a common passageway, a distribution slot and branch slots for supplying an air-fuel mixture to engine cylinders. The distribution and branch slots are closed by a cylinder head. Any liquid fuel in the distribution and branch slots are vaporized with heat from the cylinder head.

3 Claims, 3 Drawing Figures

INTAKE PASSAGE STRUCTURE FOR INTERNAL COMBUSTION ENGINES

BACKGROUND OF THE INVENTION

The present invention relates to an improvement in an intake passage structure for internal combustion engines, and more particularly to an intake passage structure for internal combustion engines which includes a primary air-fuel mixture passage designed for preventing vapor lock from occuring in a secondary slow fuel supply passage.

Internal combustion engines having a two-barrel carburetor for use on automobiles include a secondary slow fuel supply passage extending as a bypass passage from the carburetor to a secondary air-fuel mixture passage adjacent to a secondary throttle valve for supplying additional fuel into engine combustion chambers for improved transient engine operation when the secondary air-fuel mixture passage comes into operation in addition to the primary air-fuel mixture passage. Heat from the engine however has a tendency to vaporize fuel in the secondary slow fuel supply passage when the engine operates under a low load with only the primary air-fuel mixture passage being active. Such fuel vaporization causes vapor lock in the secondary slow fuel supply passage, which then fails to supply fuel when the secondary throttle valve is opened. Such a condition leads to engine operation irregularities such as hesitation and stumbling, and drivability of the automobile becomes worse. Known arrangements for preventing such difficulties include means for introducing a portion of fuel from the secondary slow fuel supply passage into the primary air-fuel mixture passage or an air induction pipe, and an adjustment for discharge characteristics of an accleration pump for the secondary slow fuel supply passage. However, these prior proposals are disadvantageous in that the former arrangement makes it difficult to control a small amount of fuel during idling, and the latter means has limitations on the possible range of adjustment and frequently fails to adjust the acceleration pump in a desired condition.

SUMMARY OF THE INVENTION

It is an object of the present invention to provide an intake passage structure for internal combustion engines in automobiles which will supply an air-fuel mixture to engine cylinders reliably under transient conditions of engine operation for attaining smooth drivability.

According to the present invention, an intake passage structure for an internal combustion engine includes a primary air-fuel mixture passage extending from a two-barrel carburetor remotely from a water jacket for containing hot water. A secondary slow fuel supply passage extending from a float chamber in the two-barrel carburetor is defined closely to the primary air-fuel mixture passage and has a fuel supply port opening into a secondary air-fuel mixture passage for supplying additional fuel into combustion chambers to remove any transient operation irregularities when the secondary air-fuel mixture passage comes into operation. Fuel in the secondary slow fuel supply passage is prevented from being vaporized as it is cooled by the air-fuel mixture flowing through the primary air-fuel mixture passage and the primary air-fuel mixture passage is located away from the water jacket. The primary air-fuel mixture passage is composed of a common passageway, a distribution slot and branch slots for supplying an air-fuel mixture to engine cylinders. The distribution and branch slots are closed by a cylinder head. Any liquid fuel in the distribution and branch slots are vaporized with heat from the cylinder head.

The above and other objects, features and advantages of the present invention will become more apparent from the following description when taken in conjunction with the accompanying drawings in which a preferred embodiment of the present invention is shown by way of illustrative example.

DESCRIPTION OF THE PREFERRED EMBODIMENT

Figure 1:
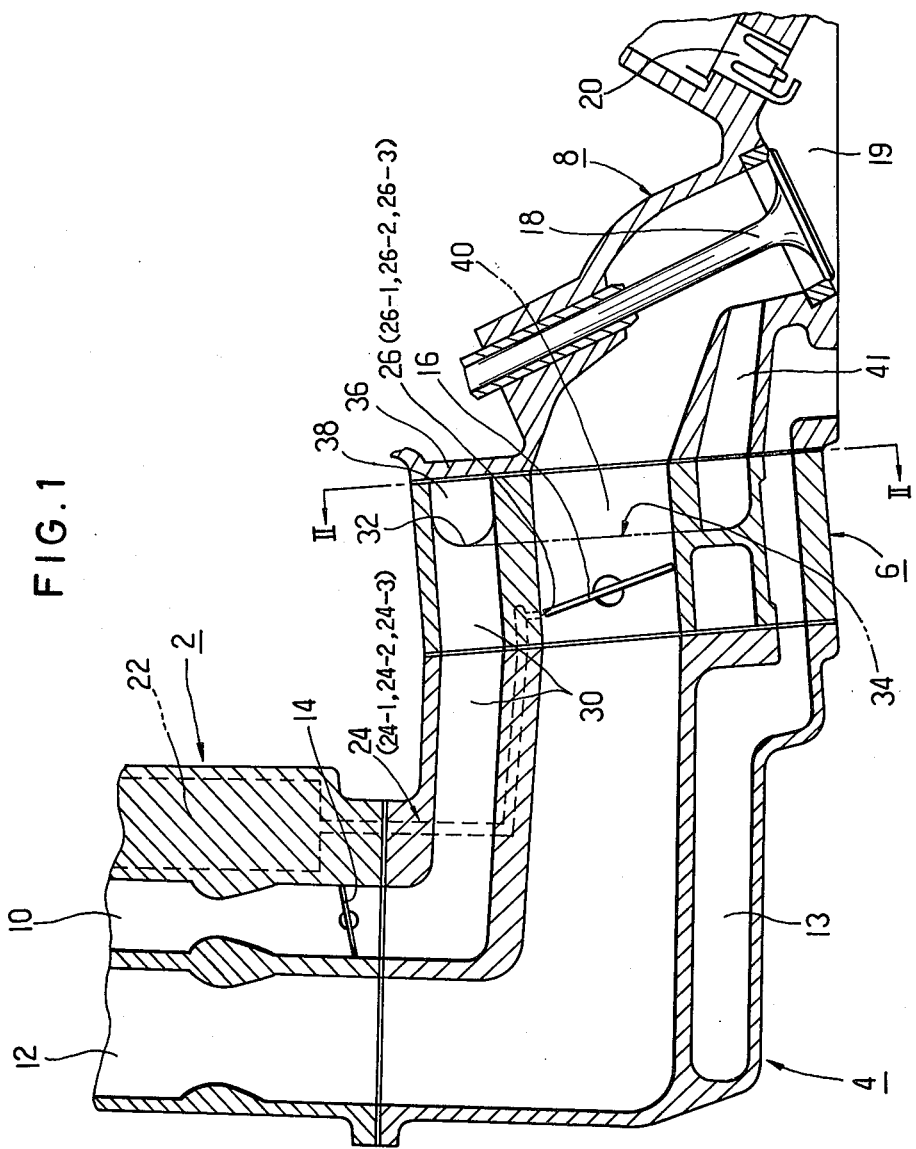
FIG. 1 is a fragmentary cross-sectional view of an intake passage structure incorporated in an internal combustion engine according to the present invention.

As shown in FIG. 1, an internal combustion engine in which an intake passage structure according to the present invention is incorporated generally includes a two-barrel carburetor 2, an intake manifold 4 connected to the two-barrel carburetor 2, and a throttle valve body or block 6 interposed between the intake manifold 4 and an engine cylinder head 8. The intake passage structure comprises a primary air-fuel mixture passage 10 extending from one of two barrels of the carburetor 2 for supplying an air-fuel mixture to a combustion chamber 19 in the engine cylinder head 8 through an intake valve 18 supported therein while the internal combustion engine operates in a full range of loads, and a secondary air-fuel mixture passage 12 extending from the other barrel of the carburetor 2 for supplying an air-fuel mixture to the combustion chamber 19 during operation of the internal combustion engine under higher loads. The air-fuel mixture flowing through the primary air-fuel mixture passage 10 is controlled by a throttle valve 14 mounted in the carburetor 2 on the primary side, and the air-fuel mixture flowing through the secondary air-fuel mixture passage 12 is controlled by a throttle valve 16 disposed in the throttle valve block 6 on the secondary side. The air-fuel mixture introduced in the combustion chamber 19 is ignited by an ignition plug 20 when the air-fuel mixture is compressed by a piston (not shown).

Figure 2:
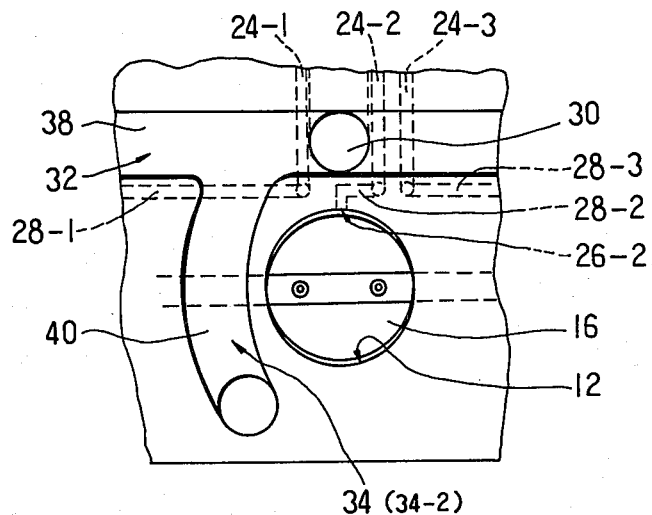
FIG. 2 is a fragmentary elevational view taken along line II—II of FIG. 1.
Figure 3:
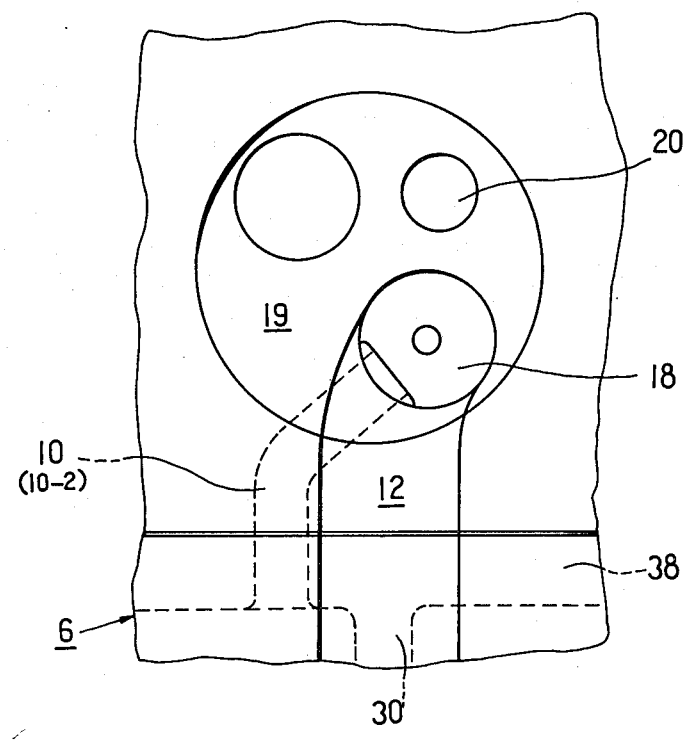
FIG. 3 is a schematic plan view showing a combustion chamber in the internal combustion engine illustrated in FIG. 1.

The two-barrel carburetor 2 includes a float chamber 22 from which extends a secondary slow fuel supply passage 24 that communicates with a secondary slow fuel supply port 26 opening into the secondary air-fuel mixture passage 12 adjacent to the secondary throttle valve 16. The secondary slow fuel supply passage 24 serves to supply fuel into the secondary air-fuel mixture passage 12 to improve fuel combustion in the combustion chamber 19 during transient conditions when the secondary air-fuel mixture passage 12 comes into operation. As shown in FIG. 2, there are provided as many secondary slow fuel supply passages 24-1, 24-2, 24-3 as there are engine cylinders. In the illustrated embodiment, three such secondary slow fuel supply passages are connected to three branches 28-1, 28-2, 28-3, respectively, which communicate with three secondary slow fuel supply ports 26-1, 26-2, 26-3, respectively, for feeding additional fuel into three engine cylinders.

The secondary slow fuel supply passage 24 is defined as closely to the primary air-fuel mixture passage 10 as possible so that the fuel passing through the secondary slow fuel supply passage 24 will be prevented by a low-temperature air-fuel mixture going through the primary air-fuel mixture passage 10 from being heated to high temperatures. Thus, the secondary slow fuel supply passage 24 is protected against vapor lock.

The primary air-fuel mixture passage 10 is spaced away from a water jacket 13 disposed below the secondary air-fuel mixture passage 12 and containing hot water. The primary air-fuel mixture passage 10 can thus be prevented from being heated by the hot water jacket 13. The primary air-fuel mixture passage 10 is composed of a single common passageway 30 extending through the carburetor 2, the intake manifold 4 and the throttle valve block 6. The throttle valve block 6 has in a surface thereof facing the cylinder head 8 a distribution slot 32 communicating with the commmon passageway 30 and from which extend three branch slots 34 (34-1, 34-2, 34-3) that communicate respectively with the engine cylinders. The cylinder head 8 includes a flange wall 36 which covers the distribution slot 32. When the throttle valve block 6 and the cylinder head 8 are assembled together, the distribution slot 32 and the branch slots 34 serve as a primary air-fuel mixture distribution passageway 38 and branch passageways 40, respectively, which extend downstream of the common passageway 30. As best shown in FIG. 2, the branch passageway 34 extends arcuately around the secondary air-fuel mixture passage 12 to an intake port 41 (FIG. 1) which opens into the primary air-fuel mixture passage 10 just upstream of the combustion chamber 19.

Operation of the intake passage structure thus constructed is a follows: When the internal combustion engine operates under a low load, the primary throttle valve 14 opens to allow an air-fuel mixture having a desired or ideal air-fuel ratio to flow through the primary air-fuel mixture passage 10 into the combustion chamber 19. As the engine load becomes higher, the secondary throttle valve 26 opens to let an air-fuel mixture pass through the secondary air-fuel mixture passage 12 into the combustion chamber 19. With conventional intake passage constructions, the fuel in the secondary slow fuel supply passage 24 would be vaporized with heat from the engine, causing vapor lock in the secondary slow fuel supply passage 24. According to the present invention, however, the secondary slow fuel supply passage 24 is located closely to the primary air-fuel mixture passage 10 to keep the fuel in the secondary slow fuel supply passage 24 at a desired temperature under the influence of the air-fuel mixture flowing through the primary air-fuel mixture passage 10. The fuel in the secondary slow fuel supply passage 24 is thus prevented from being vaporized, and can be supplied into the secondary air-fuel mixture passage 12 in a desired quantity immediately when the secondary throttle valve 16 is opened, thereby smoothing out or eliminating transient operation irregularities such as hesitation and stumbling for improved drivability when the secondary air-fuel mixture passage 12 comes into operation in addition to the primary air-fuel mixture passage 10.

With the primary air-fuel mixture distribution passageway 38 being partly defined by the flange wall 36 of the cylinder head 8, any fuel of a liquid phase in the distribution passageway 38 can be vaporized with heat conducted from the engine by the flange wall 36. Therefore, the air-fuel mixture supplied through the primary air-fuel mixture passage 10 is rendered uniform for increased combustibility of the fuel, with the results that limits as to the leanness of the air-fuel mixture and exhaust gas recirculation can be improved.

While the primary air-fuel mixture passage 10 is located remotely from the water jacket 13 for cooling the secondary slow fuel supply passage 24, the distribution passageway 38 and the branch slots 40 are heated by the adjoining cylinder head 8 for thereby effectively vaporizing any liquid fuel in the primary air-fuel mixture passage 10. Accordingly, no problem arises out of the fact that the primary air-fuel mixture passage 10 is spaced away from the water jacket 13.

Although a certain preferred embodiment has been shown and described in detail, it should be understood that many changes and modifications may be made therein without departing from the scope of the appended claims.

What is claimed is:

1. An intake passage structure for an internal combustion engine, comprising:

a two-barrel carburetor having a float chamber;
a cylinder head having combustion chambers therein;
an intake manifold coupled with said two-barreled carburetor;
a block interposed between said intake manifold and said cylinder head, said block having a first surface thereon which is positioned in opposed abutting engagement with a second surface on said cylinder head;
primary air-fuel mixture passage means extending from said carburetor through said intake manifold, said block and said cylinder head for supplying an air-fuel mixture to said combustion chambers when said internal combustion engine operates in a full range of loads including relatively low loads, said primary passage means including a common primary passage extending from said carburetor through said intake manifold and thence through said block, said common primary passage having the downstream end thereof terminating at said first surface of said block;
said primary passage means having a movable primary throttle valve disposed in said carburetor in association with said common primary passage;
secondary air-fuel mixture passage means extending from said carburetor through said intake manifold, said block and said cylinder head for supplying an air-fuel mixture to said combustion chambers when the internal combustion engine operates under relatively high loads, said secondary passage means having a secondary passage which extends from said intake manifold through said block and thence through said cylinder head for communication with each respective said combustion chamber, said secondary passage having a movable secondary throttle valve associated therewith and disposed in said block;
said primary passage means including a plurality of intake port passages which are formed in said cylinder head and have upstream ends thereof opening through said second surface, each intake port passage having a downstream end which communicates with a respective said combustion chamber;
said primary passage means including an elongated distribution slot which is formed in said block and communicates with said common primary passage at the downstream end thereof, said distribution slot as formed in said block extending transversely relative to said common primary passage and being formed in said block directly at said first surface so that one side of said distribution slot opens through said first surface, said primary passage means also including a plurality of branch slots each associated with a respective said combustion chamber, each said branch slot having an upstream end thereof in communication with the distribution slot and a downstream end thereof in communication with the upstream end of a respective said intake port passage, said branch slots being formed in said block directly at said first surface so that one side of said branch slots opens outwardly through said first surface, the outwardly opening sides of said distribution and branch slots being closed by said second surface as formed on said cylinder head;

a water jacket positioned adjacent one side of said secondary passage, said common primary passage being located substantially adjacent the diametrically opposite side of said secondary passage from said water jacket so as to be remotely located from said water jacket;

each said branch slot extending transversely with respect to, but in close proximity to, the secondary passage associated with the respective combustion chamber; and a secondary slow fuel supply passage extending from said float chamber adjacent to said common primary passage and terminating in a secondary slow fuel supply port opening into said secondary passage in the vicinity of said secondary throttle for supplying fuel into the secondary passage when the air-fuel mixture is supplied through the secondary passage to the combustion chamber.

2. An intake structure according to claim 1, wherein said intake port passage and said distribution slot are positioned approximately on opposite sides of the secondary passage, and wherein said branch slot extends arcuately around at least a portion of the periphery of the respective secondary passage.

3. An intake passage structure according to claim 1, wherein said secondary slow fuel supply passage includes an elongated passage portion which extends substantially directly between and substantially parallel to said common primary passage and said secondary passage.

* * * * *